United States Patent [19]
Chiou

[11] Patent Number: 5,863,625
[45] Date of Patent: *Jan. 26, 1999

[54] STABLE SILICONE COATED FABRIC WITHOUT ADHESION PROMOTER

[75] Inventor: Joseph J. Chiou, Clemmons, N.C.

[73] Assignee: Highland Industries, Inc., Greensboro, N.C.

[*] Notice: The term of this patent shall not extend beyond the expiration date of Pat. No. 5,700,532.

[21] Appl. No.: 994,462

[22] Filed: Dec. 19, 1997

Related U.S. Application Data

[63] Continuation-in-part of Ser. No. 559,984, Nov. 17, 1995, Pat. No. 5,700,532.

[51] Int. Cl.$^6$ .................................................. B60R 21/20
[52] U.S. Cl. .................... 428/36.1; 280/743.1; 427/387; 427/389.9; 428/446; 442/164; 442/168
[58] Field of Search .................. 428/36.1, 446; 280/743.1; 427/387, 389.9; 442/164, 168

[56] References Cited

U.S. PATENT DOCUMENTS

| | | | |
|---|---|---|---|
| 4,070,224 | 1/1978 | Zemlin et al. | 156/314 |
| 4,499,234 | 2/1985 | Pratt et al. | 524/783 |
| 4,503,208 | 3/1985 | Lin et al. | 528/15 |
| 4,513,115 | 4/1985 | Beers | 524/731 |
| 4,528,353 | 7/1985 | Lucas et al. | 528/21 |
| 4,539,367 | 9/1985 | Beers | 524/731 |
| 5,082,886 | 1/1992 | Jeram et al. | 524/403 |
| 5,258,211 | 11/1993 | Momii et al. | 428/35.2 |
| 5,312,690 | 5/1994 | Fukuda et al. | 428/447 |
| 5,700,532 | 12/1997 | Chiou | 428/36.1 |

OTHER PUBLICATIONS

Silicon Compounds from the Encyclopedia of Chemical Technology, vol. 20, Third Edition by John Wiley & Sons, Inc. 1982.
Article on Silicones; Origin and Author Unknown.

*Primary Examiner*—James J. Bell
*Attorney, Agent, or Firm*—Rhodes, Coats & Bennet, L.L.P.

[57] ABSTRACT

A silicone rubber composition that is capable of adhering to the surface of various kinds of substrates, in particular woven fabrics or the like in the absence of an adhesion promoter or coupling agent. The composition of the present invention includes a catalyst system which enhances the cure rate of the silicone compound. Strong adhesion of the silicone rubber coating composition to the substrate is achieved at high coating speeds using a mixture of an organopolysiloxane, an organohydrogenpolysiloxane resin and a catalyst system. The catalyst system is made up of either an unaccompanied platinum catalyst or a dual system utilizing a platinum catalyst and a peroxide curing agent. The silicone rubber composition is particularly suitable as a coating for airbag fabrics.

18 Claims, No Drawings ced which is used as an airbag fabric coating.
STABLE SILICONE COATED FABRIC WITHOUT ADHESION PROMOTER This application is a continuation-in-part of application Ser. No. 08/559,984 (now U.S. Pat. No. 5,700,532, proposed issue date Dec. 23, 1997).

BACKGROUND OF THE INVENTION

The present invention relates to a silicone rubber coating composition which firmly adheres to the surface of a variety of substrate materials without the addition of an adhesion promoter. More particularly, the present invention relates to woven fabrics, in particular airbag fabric, which are coated with the silicone rubber coating composition at high production speeds.

Silicone rubbers are widely used commercially for a variety of purposes including electric insulation, seals, gaskets, mold forming materials, coating applications for substrates and the like. It is widely known and accepted in the silicone coating industry that the addition of an adhesion promoter or a coupling agent to a silicone coating composition is necessary in order to achieve adequate adhesion of the silicone coating to a variety of substrates. An adhesion promoter is considered desirable, otherwise a primer has to be utilized. Unfortunately, the use of a primer makes the coating of substrates more complex by adding another process step, and aggravates the working environment with the use of additional organic solvents. Further, primers add to labor costs, which are considerably more than the costs associated with an adhesion promoter being incorporated into the coating composition during the manufacturing process.

Although different substrates may require a different kind of adhesion promoter, the organofunctional silanes are widely used as adhesion promoters in various applications in the art of silicone chemistry. Further, these compounds can be classified into different groups according to their functionality. In this regard, U.S. Pat. No. 5,312,690 discloses the addition of an adhesion promoter also known as a coupling agent to its silicone rubber composition. The adhesion promoter is in the form of an organosilane compound having an isocyanato-containing group-NCO and a hydrolyzable group such as alkoxy groups. By virtue of the addition of this component, the silicone rubber composition as cured firmly adheres to the substrate. U.S. Pat. No. 4,499,234 discloses a curable silicone coating composition comprising, among other components, an adhesion promoter to provide primerless adhesion of the composition to the substrate. U.S. Pat. No. 4,528,353 also discloses silicone compositions containing self-bonding additives of which the amine functional silanes are the most preferred. U.S Pat. Nos. 4,513,115 and 4,539,367 each discloses a silicone rubber composition having an adhesion promoter to facilitate the bonding of the composition to the substrate material.

U.S. Pat. No. 5,258,211 to Momii et al. is indicative of the disadvantages in the existing art. The Momii, '211, reference discloses a coating composition for air bag fabric which combines an organopolysiloxane and a linear organohydrogensiloxane but also further requires an organosilane adhesion promoter, or partial hydrolyzate, thereof. While compositions, such as those disclosed in Momii, and the other prior art described above, which contain adhesion promoters are commonly used in the silicone coating industry, they nevertheless have distinct disadvantages. Adhesion promoters are generally more expensive than the base polymer. As such, the overall costs for manufacturing the coating composition dramatically increases. The addition of the adhesion promoter may also require an extra processing step during the mixing cycle, which further increases the cost of production. Most importantly, it has been found that the addition of an adhesion promoter causes problems during the curing cycle. In this regard, the adhesion promoter can retard the curing time, resulting in a longer processing time for coating compositions containing such adhesion promoters. Extra processing time often results in higher energy costs and overhead and lower productivity. Adhesion promoters may also accelerate the cure, which creates other problems such as scorching of the composition and unpredictable chemical reactions. This results in waste, increased costs and problems in controlling the coating of the silicone rubber composition onto a substrate.

SUMMARY OF THE INVENTION

The present invention overcomes the disadvantages of prior art silicone coating compositions by providing a self-adhesive silicone rubber composition, which strongly adheres to fabric substrates like nylon or polyester without the addition of adhesion promoters, coupling agents, or the like. In general, the present invention utilizes an organohydrogensiloxane resin, as distinct from the linear form, with an organopolysiloxane. In the absence of an adhesion promoter in the silicone coating composition, the curing and adherence of the silicone coating to the fabric substrate proceeds at much faster rates than when present.

One composition of the present invention utilizes a dual catalyst system which enhances the cure rate of the silicone compound. Strong adhesion of the coating composition to the substrate, in particular woven fabrics, is achieved using a mixture of a platinum catalyst, for example, chloroplatinic acid, with an organohydrogenpolysiloxane resin, like polymethylhydrogensiloxane resin, and an organopolysiloxane, like vinyl polydimethylsiloxane. This combination produces a coating having a good dry surface, and eliminates the sticking problems commonly associated with processing an uncured compound after the solvent has been evaporated. An additional step involving a peroxide catalytic curing agent, such as 2,4-dichlorobenzoyl peroxide, provides the ultimate degree of cure desirable for the silicone rubber that is used as an airbag fabric coating.

The self-adhesive silicone rubber composition utilizing a dual catalyst system is uniform blend which comprises (a) 100 parts by weight of an organopolysiloxane represented by the average unit formula

$R_nSiO_{(4-n)/2}$ wherein R is an unsubstituted or substituted monovalent hydrocarbon group and n is a positive number in the range from 1.98 to 2.01, and having a viscosity of at least 300 centistokes at 25° C.; (b) about 0.1 to 20 parts by weight of a polymethylhydrogensiloxane resin having the general formula

M'Q wherein M' is $R_2SiHO_{0.5}$ monofunctional unit, R is a monovalent hydrocarbon radical selected from the group consisting of lower alkyl and aryl radicals, and Q is $SiO_2$, a tetrafunctional unit; (c) a platinum compound; and (d) a peroxide curing agent.

An additional embodiment of the present invention is provided for by an unaccompanied single curing agent system which achieves comparable adhesion of silicone rubber to woven fabrics without the need for an adhesion promoter. Any catalyst that promotes the hydrosilation reaction between a silicon hydride and an ethylenically unsaturated polyorganosiloxane may be used unaccompanied in place of the dual catalyst system of the first composition. Examples of such catalysts include precious metal catalysts, like platinum, which may be used unaccompanied to achieve good curing and adhesion to fabric. The platinum catalyst promotes the reaction between the silicone hydride and the unsaturated polyorganosiloxane. The platinum catalyst system is a substantially faster curing system. However, it is more sensitive to contamination. Curing and adhesion failure may result from poisoned platinum catalyst.

DETAILED DESCRIPTION OF THE EMBODIMENTS

According to the first approach, the self-adhesive silicone rubber coating composition utilizing a dual catalyst system comprises the following components:

a) 100 parts by weight of an organopolysiloxane represented by the average unit formula $$R_n SiO_{(4-n)/2}$$

wherein R is an unsubstituted or substituted monovalent hydrocarbon group and n is a positive number in the range from 1.98 to 2.01, and having a viscosity of at least 300 centistokes at 25° C.;

b) about 0.1 to 20 parts by weight of an organohydrogenpolysiloxane having the general formula $$M'Q$$

wherein M' is $R_2SiHO_{0.5}$ monofunctional unit, R is a monovalent hydrocarbon radical selected from the group consisting of lower alkyl and aryl radicals, and Q is $SiO_2$, a tetrafunctional unit where the ratio of M units to Q units may vary from 10:1, and is preferably about 2:1;

c) a platinum compound; and d) a peroxide curing agent.

Component (a) is an organopolysiloxane represented by the average unit formula of $$R_n SiO_{(4-n)/2},$$

wherein R is an unsubstituted or substituted monovalent hydrocarbon group and n is a positive number in the range from 1.98 to 2.01. The organopolysiloxane has a viscosity of at least 300 centistokes at 25° C. The monovalent group represented by R is selected from the group consisting of alkyl groups, cycloalkyl groups, alkenyl groups and aryl groups. A preferred example of the organopolysiloxane is methylvinyl polysiloxane with the methyl group in an amount of at least 50 mol % or, more preferably, at least 80 mol % and the vinyl group in an amount of at least 0.01 mol %. The organopolysiloxane should have a viscosity of at least 300 centistokes at 25° C. The desirable viscosity is at least 10,000 cps. The organopolysiloxane preferably has a substantially linear structure. In addition, the terminal groups are preferably a trivinylsilyl group.

Component (b) is an organohydrogenpolysiloxane resin represented by the formula $$M'Q$$

wherein M' is $R_2SiHO_{0.5}$ monofunctional unit, R is a monovalent hydrocarbon radical free of aliphatic unsaturation, and the group denoted by Q is $SiO_2$, a tetrafunctional unit. Although R is preferably a methyl group, R can also be represented by the following groups such as alkyl and aryl groups. The preferred organohydrogenpolysiloxane is polymethylhydrogensiloxane. The organohydrogenpolysiloxane may be used in an amount of about 0.1 to about 20 parts by weight, preferably about 0.5–5.0 parts for 100 parts of component (a).

The silicone rubber coating composition contains a dual catalyst system that enhances the cure rate of the silicone compound. Component (c), a platinum compound, is a catalyst which promotes the reaction leading to curing of the coating composition. Although any platinum compound may be used in the composition, the preferred compound is chloroplatinic acid or any complex thereof. The amount of the platinum compound should be between about 1 to about 1000 ppm, preferably 5 to 10 ppm, for 100 parts of organopolysiloxane.

Component (d) of the coating composition is organic peroxide which functions as a curing agent. Examples of the organic peroxide include benzoyl peroxide, 2,4-dichlorobenzoyl peroxide, orthochlorobenzoyl peroxide, di-t-butylperoxide, dicumyl peroxide, t-butyl perbenzoate, t-butyl peracetate, 2,5-dimethyl-2,5-di(t-butylperoxy) hexane, and (t-butylperoxy)myristyl carbonate. The organic peroxide may be used in an amount of between 0.1 and 5 parts, preferably between about 1 and about 3 parts for 100 parts of the organopolysiloxane.

EXAMPLE 1 dual system 100 parts by weight of component (a) an organopolysiloxane, SE 6162, a product supplied by GE, containing at least one methylvinyl group and fumed silica was prepared with 10 parts per million (ppm) of a platinum catalyst, $H_2PtC_{16}$, having a viscosity of at least 300 centistokes. The mixture was dispersed in 230 parts of toluene to produce a solid content of about 30% by weight in the composition.

Next, the solvated rubber mixture was blended in a Ross mixer with 2 parts by weight of an organohydrogenpolysiloxane resin (88104, a product supplied by GE Silicone) and 3.5 parts by weight of organic peroxide as a second curing agent to produce a uniform curable composition. The silicone rubber composition was, again, coated onto at least one surface of plain-woven fabric of 420 denier 6,6 and 6 nylon fibers in a coating weight of 1.5 oz. per square yard using a knife over roll coating apparatus well known to those skilled in the art. It should be noted that other coating means may also be used. The coated fabric was then dried under hot air at about 210° F. for approximately 1–2 minutes. The silicone coated fabric was then cured in a hot air oven at 350° F. for about 5 minutes to provide a test sample of a silicone rubber coated fabric. The cured, coated fabric successfully passed a very aggressive Scott-type crease flex test for 500 cycles with no failure in the adhesive properties of the coated fabric. The results are shown below in Table 1.

TABLE 1

| Coating Composition | Solid content, % | Viscosity, centistokes | Substrate | Cure Conditions | Crease-flex rating* |
|---|---|---|---|---|---|
| No. 1 | 30 | 15,000 | 420 d Nylon fabric | 5 min/ 350° F. | 5 |

*Crease-flex test results are rated from 1–5 with 5 being the best. 4 and 5 are passing grades.

630 denier and 315 denier 6,6 nylon fibers were also coated with the silicone rubber composition, and subjected to the same cure conditions described in Example 1. The cured coated fabric produced crease flex test results comparable to those shown in Table 1.

The coating mixture described in Example 1 was also coated on plain woven Nylon 6 fabric and polyester fabric. The coating exhibited good adhesion to the fabrics and passed the crease-flex test. The results are shown below in Table 2.

TABLE 2

| Coating Composition | Substrate | Cure Conditions | Crease-flex rating |
|---|---|---|---|
| No. 1 | Nylon-6 fabric 420 d | 5 min/350° F. | 5 |
| No. 1 | Polyester fabric 210 d | 5 min/350° F. | 5 |

COMPARATIVE EXAMPLE 1(A)

Another coating composition was prepared in the same formulation as described under Example 1, except that the organohydrogenpolysiloxane resin (component b) was not added. The coating composition was cured and bonded to the fabric substrate in the manner disclosed in Example 1. Poor adhesion of the silicone rubber coating to the substrate occurred, the results of which are shown below in Table 3.

TABLE 3

| Coating Composition | Substrate | Coating | Cure Conditions | Crease-flex rating |
|---|---|---|---|---|
| No. 2* | 420 d Nylon fabric | Silicone without the organohydrogenpolysiloxane resin | 10 min/ 350° F. | 1 |

*No methyl hydrogen resin.

COMPARATIVE EXAMPLE 1(B)

Another silicone rubber coating composition was prepared in the same formulation as disclosed in Example 1, except that an adhesion promoter, 3-isocyanato-propyltrimethoxysilane, was added. 1 part, 3 parts, or 5 parts of the 3-isocyanato-propyltrimethoxysilane were mixed with 100 parts of the silicone rubber composition to produce three coating compositions, Nos. 3, 4, 5, respectively. Each mixture was then coated onto nylon 6,6 fabric, and then processed under the same conditions as in Example 1 with one exception. Additional cure time was needed to achieve optimum curing conditions. The adhesive bonding strengths based on crease-flex tests are shown below in Table 4. It is clear from the test results that with the addition of the adhesion promoter to the coating composition, the amount of time needed to achieve good adhesion is much greater.

TABLE 4

| | Adhesion promoter, | Cure time* | | |
|---|---|---|---|---|
| Coating compostions | Isocyanto-group containing silane, parts | 5 min. Crease-flex rating | 10 min. Crease-flex rating | 15 min. Crease-flex rating |
| No. 3 | 1 | 2 | 4 | 5 |
| No. 4 | 3 | 1 | 2 | 5 |
| No. 5 | 5 | 1 | 2 | 5 |

● Cure temperature = 350° F.

According to the second approach, the self-adhesive silicone rubber coating composition utilizing an unaccompanied platinum catalyst system comprises the following components: (a) 100 parts by weight of an organopolysiloxane represented by the average unit formula $R_nSiO_{(4-n)/2}$ as described in the first composition; (b) about 0.1 to 20 parts by weight of an organohydrogenpolysiloxane having the general formula, M'Q, as described in the first composition; and (c) a platinum compound.

This second silicone rubber coating composition contains an unaccompanied platinum catalyst system that catalyzes the cure of the silicone compound. Component (c), a platinum compound, is a catalyst which promotes the reaction leading to curing of the coating composition. Again, although any platinum compound may be used in the composition, the preferred compound is chloroplatinic acid or any complex thereof. The amount of the platinum compound should be between about 1 to about 1000 ppm for 100 parts of organopolysiloxane.

EXAMPLE 2 unaccompanied platinum 100 parts by weight of component (a) an organopolysiloxane, SE 871, a product supplied by GE, containing at least one methylvinyl group and famed silica was prepared with about 10 parts per million (ppm) of a platinum catalyst, $H_2PtCl_6$, having a viscosity of at least 300 centistokes. The mixture was dispersed in 230 parts of toluene to produce a solid content of about 30% by weight in the composition.

Next, the solvated rubber mixture was blended in a mixer with 2 parts by weight of an organohydrogenpolysiloxane resin (88104, a product supplied by GE Silicone) to produce a uniform curable composition. The silicone rubber composition was coated as in Example 1 onto at least one surface of plain-woven fabric of 420 denier nylon in a coating weight of 1.5 oz. per square yard. The coated fabric was then dried under hot air at about 212° F. for approximately 1 minute. The silicone coated fabric was then cured in a hot air oven at 350° F. for about 5 minutes to provide a test sample of a silicone rubber coated fabric. A second test sample was prepared under substantially the same conditions, however the coated fabric was allowed to a Scott-type crease flex test for 500 cycles with no failure in the adhesive properties of the coated fabric. The results are shown below in Table 5.

TABLE 5

| unaccompanied platinum | | |
|---|---|---|
| Cure Time | 5 min. | 10 min. |
| Crease-flex Rating | 4 | 5 |

● Drying Conditions: 1 min. at 212° F.
● Cure Temperature = 350° F.

All references disclosed herein are hereby incorporated by reference.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

I claim:

1. A silicone coated fabric, comprising:
   a) a fabric substrate; and
   b) a layer of a silicone rubber cured and adhering to at least one surface of the fabric substrate, the rubber being a cured self-adhesive silicone rubber composition comprising:
      i) 100 parts by weight of an organopolysiloxane represented by the general formula $R_nSiO_{(4-n)/2}$ wherein R is an unsubstituted or substituted monovalent hydrocarbon group and n is a positive number in the range from about 1.98 to 2.01, and having a viscosity of at least 300 centistokes at 25° C.;
ii) about 0.1 to about 20 parts by weight of an organohydrogenpolysiloxane resin having the general formula

M'Q wherein M' is $R_2SiHO_{0.5}$, R is a monovalent hydrocarbon radical selected from the group consisting of lower alkyl and aryl radicals, and the group denoted by Q is $SiO_2$, a tetrafunctional unit; and
iii) a curing system wherein the curing system is selected from the group consisting of platinum and the combination of platinum and peroxide.

2. The silicone coated fabric of claim 1, wherein the preferred organopolysiloxane is vinyl containing polydimethylsiloxane.

3. The silicone coated fabric of claim 1, wherein the preferred organohydrogenpolysiloxane resin is polymethylhydrogensiloxane.

4. The silicone coated fabric of claim 1, wherein the preferred platinum curing agent is $H_2PtCl_6$.

5. The silicone coated fabric of claim 4, wherein the amount of the platinum catalyst is in the range from about 5 to about 10 ppm for 100 parts by weight of the organopolysolixane.

6. The silicone coated fabric of claim 1, wherein the fabric is selected from the group consisting of nylon and polyester.

7. A silicone rubber coated airbag, comprising:
a) airbag fabric; and
b) a layer of a silicone rubber cured and adhered to at least one surface of the airbag fabric, the rubber being a cured self-adhesive silicone rubber composition comprising:
i) 100 parts by weight of an organopolysiloxane represented by the general formula $R_nSiO_{(4-n)/2}$ wherein R is an unsubstituted or substituted monovalent hydrocarbon group and n is a positive number in the range from about 1.98 to 2.01, and having a viscosity of at least 300 centistokes at 25° C.;
ii) about 0.1 to about 20 parts by weight of an organohydrogenpolysiloxane resin having the general formula

M'Q wherein M' is $R_2SiHO_{0.5}$, R is a monovalent hydrocarbon radical selected from the group consisting of lower alkyl and aryl radicals, and the group denoted by Q is $SiO_2$, a tetrafunctional unit; and
iii) a curing system wherein the curing system is selected from the group consisting of platinum and the combination of platinum and peroxide.

8. The silicone rubber coated airbag of claim 7, wherein the preferred organopolysiloxane is a vinyl containing polydimethylsiloxane.

9. The silicone rubber coated airbag of claim 7, wherein the preferred organohydrogenpolysiloxane is polymethylhydrogensiloxane.

10. The silicone rubber coated airbag of claim 7, wherein the preferred platinum curing agent is $H_2PtCl_6$.

11. The silicone coated fabric of claim 10, wherein the amount of the platinum catalyst is in the range from about 5 to about 10 ppm for 100 parts by weight of the organopolysolixane.

12. The silicone rubber coated airbag of claim 7, wherein the airbag fabric is selected from the group consisting of nylon and polyester.

13. A method of preparing airbag fabric coated with a silicone rubber, comprising the step of coating at least one surface of the airbag fabric with a composition comprising:
a) 100 parts by weight of an organopolysiloxane represented by the general formula $R_nSiO_{(4-n)/2}$ wherein R is an unsubstituted or substituted monovalent hydrocarbon group and n is a positive number in the range from about 1.98 to 2.01, and having a viscosity of at least 300 centistokes at 25° C.;
b) about 0.1 to about 20 parts by weight of an organohydrogenpolysiloxane resin having the general formula

M'Q wherein M' is $R_2SiHO_{0.5}$, R is a monovalent hydrocarbon radical selected from the group consisting of lower alkyl and aryl radicals, and the group denoted by Q is $SiO_2$, a tetrafunctional unit; and
c) a curing system wherein the curing system is selected from the group consisting of platinum and the combination of platinum and peroxide.

14. The method of claim 13, wherein the preferred organopolysiloxane is a vinyl containing polydimethylsiloxane.

15. The method of claim 13, wherein the preferred organohydrogenpolysiloxane is polymethylhydrogensiloxane.

16. The method of claim 13, wherein the preferred platinum curing agent is $H_2PtCl_6$.

17. The method of claim 16, wherein the amount of the platinum catalyst is in the range from about 5 to about 10 ppm for 100 parts by weight of the organopolysolixane.

18. The method of claim 13, wherein the airbag fabric is selected from the group consisting of nylon and polyester.

* * * * *